United States Patent [19]

Kubo et al.

[11] Patent Number: 4,480,896

[45] Date of Patent: Nov. 6, 1984

[54] OPTICAL FILTER SUITABLE FOR PORTRAIT PHOTOGRAPHY

[75] Inventors: Souichi Kubo, Chiba; Yukio Okano, Izumi, both of Japan

[73] Assignee: Minolta Camera Kabushiki Kaisha, Osaka, Japan

[21] Appl. No.: 340,026

[22] Filed: Jan. 18, 1982

[30] Foreign Application Priority Data

Jan. 16, 1981 [JP] Japan ............................ 56-5617

[51] Int. Cl.$^3$ ........................ G02B 5/20; G02B 13/20
[52] U.S. Cl. .................................. 350/431; 350/439
[58] Field of Search ............................ 350/431, 439

[56] References Cited

U.S. PATENT DOCUMENTS

| | | | |
|---|---|---|---|
| 1,627,892 | 5/1927 | Frederick | 350/431 |
| 2,959,105 | 11/1960 | Sayanagi | 350/431 |
| 3,833,288 | 9/1974 | Nilsson | 350/431 |
| 3,900,249 | 8/1975 | Tsunashima et al. | 350/431 |
| 4,124,276 | 11/1978 | Okano et al. | 350/431 |
| 4,329,023 | 5/1982 | Harrison et al. | 350/431 |

*Primary Examiner*—John K. Corbin
*Assistant Examiner*—Scott J. Sugarman
*Attorney, Agent, or Firm*—Jackson, Jones & Price

[57] ABSTRACT

An improved soft focus optical filter is provided and comprises a plurality of effective filter areas on a transparent substrate. The filter areas are designed specifically to modify the modulation transfer function of the filter so that a selective soft focus effect is achieved only for transmitted green light.

5 Claims, 8 Drawing Figures

OPTICAL FILTER SUITABLE FOR PORTRAIT PHOTOGRAPHY

BACKGROUND OF THE INVENTION

1. Field of the Invention

The present invention relates to an optical filter for use with a photographic objective lens, and more particularly to an optical filter suitable for portrait photography.

2. Description of the Prior Art

A portrait photographed with an ordinary, sharp objective lens reproduces sharply the spots, freckles, wrinkles, etc. of a face, thereby creating an unfavorable impression. To improve this, various soft focus lenses and soft focus filters with sharp lenses are provided. However, since such soft focus lenses and filters produce soft focus effects not only on the facial spots, etc., but also on the other areas of the picture, for example, a dress, hair, etc., a desirable portrait can not be obtained by them. Therefore, a desirable portrait in which the facial spots, freckles, wrinkles, and other common blemishes are reproduced softly and the other areas except for the human skin are reproduced sharply, is not obtained by the above-mentioned device.

SUMMARY OF THE INVENTION

An object of the present invention is to provide an optical filter capable of producing desirable portrait photography with a sharp objective lens in such a way that a soft focus effect is produced on the color of human skin, such as a face, hands and feet, while a sharp tone effect is given to a dress, hair, etc.

To attain their object, the inventors made subjective evaluation experiments on sharpness for various portraits produced by filters having selective soft focus effects only for a predetermined color. From the result of such experiments, the inventors have found that desirable portrait photography described above can be obtained by using a filter having a selective soft focus effect only for transmitted green light. The present invention provides such a filter suitable for portrait photography. The reason they are capable of obtaining a desirable portrait by such a filter is considered as follows. The human skin generally absorbs the green light because of hemoglobin in the blood, thereby causing its color to appear to be magenta. Facial spots, freckles, wrinkles, etc. are distributed on the background of the magenta color. A facial image formed by use of optical filter having a selective soft focus effect only for green light, results in the spots, freckles, etc. being imaged mainly by magenta light whose color is a complementary color of green, whereby the spots, freckles, etc. become inconspicuous with an approximation in magenta color to the surrounding skin. For such reason, the optical filter according to the present invention, when used with a sharp lens, produces an entirely soft image with detailed facial contrast. Additionally, since this filter brings about no soft focus effect on the red and blue light ranges, most portions of an object, except the skin color, is imaged sharply. Therefore, by use of such and optical filter with a sharp lens, a desirable portrait in which the facial spots, etc. are reproduced softly and the other portions except for human skin, for example, a dress, hair etc. are reproduced sharply, can be obtained.

DESCRIPTION OF THE PREFERRED EMBODIMENTS

Figure 1:
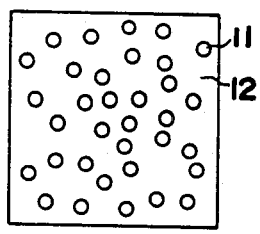
FIG. 1 is a front view of an optical filter according to an embodiment of the present invention.

FIG. 1 shows an optical filter of an embodiment of the present invention. Disposed at random on a transparent substrate are a plurality of transparent minute spots 11 which generate a phase difference in the wave front having been transmitted therefrom. The spots 11 comprise round spots of identical diameter, and the thickness of spots 11 is determined as described below. The reason to dispose the spot 11 at random is to produce a soft focus effect without bending the wave direction. Assuming that phase difference occurs between the wave front transmitted through a plurality of small spots 11 and that transmitted through another portion 12 having no spots, this phase difference $\delta$ is obtained by the following formula.

$$\delta = (n_{11} - n_{12})d \tag{1}$$

wherein $n_{11}$ = Refractive index of small spots 11
$n_{12}$ = Refractive index of portion 12 other than small spots 11
$d$ = Geometric thickness of small spots 11

Figure 2:
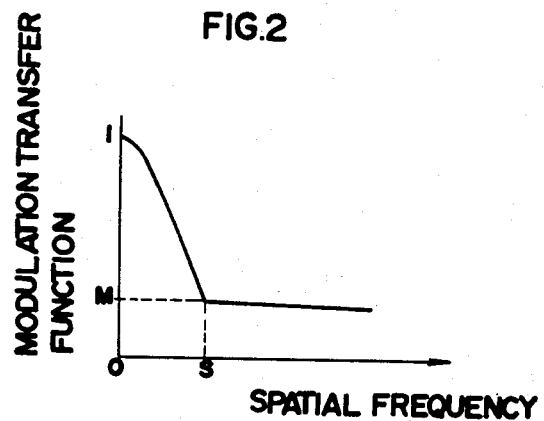
FIG. 2 is a graph of a general modulation transfer function.

When the above filter having a plurality of small spots 11 disposed at random on a transparent substrate is inserted in a sharp lens system that is an objective lens system with a defined focal plane, the modulation transfer function (hereinafter abbreviated MTF) of the entire system becomes as shown in FIG. 2, ignoring a response drop caused by the correlation of a pupil function in the lens system. As is apparent from FIG. 2, MTF has a sharply defined bending point, and the MTF value M at the bending point is given as follows:

$$M = \left(\frac{1}{A_{11} + A_{12}}\right)^2 |A_{11} + A_{12}e^{-k\delta}|^2 \tag{2}$$

wherein $K = 2\pi/\lambda$ ($\lambda$ is the wavelength of light transmitted.)
$A_{11}$ = Total area of small spots 11
$A_{12}$ = Total area of the filter portion other than small spots 11
$A_{11} + A_{12}$ = Total area of the filter On the other hand, the spatial frequency S at the bending point of MTF is given by the following:

$$S = a/f\lambda \quad (3)$$

a = Average diameter of spots 11
f = Converted focal length of a lens system with the filter mounted in front thereof
λ = Wavelength of transmitted light As is clear from formulas (2) and (3), the MTF bending point is a function of wavelength λ. When the following relation with respect to design wavelength $\lambda_0$ is satisfied, the MTF value M at the bending point becomes minimum at the wavelength $\lambda_0$.

$$\delta = (2m+1)\frac{\lambda_0}{2} \quad (4)$$

where m is an integer.

Consequently, when a wavelength λG (480 mμ ≤ λG ≤ 580 mμ) in the green wavelength range is selected as the design wavelength $\lambda_0$, the MTF value M at the bending point becomes minimum at wavelength λG, and increases along both side of the selected wavelength λG. Therefore, only for the green light transmitted through the system, a soft focus effect is obtained, but, substantially no soft focus effect is obtained for the remaining blue and red light transmitted.

Figure 3:
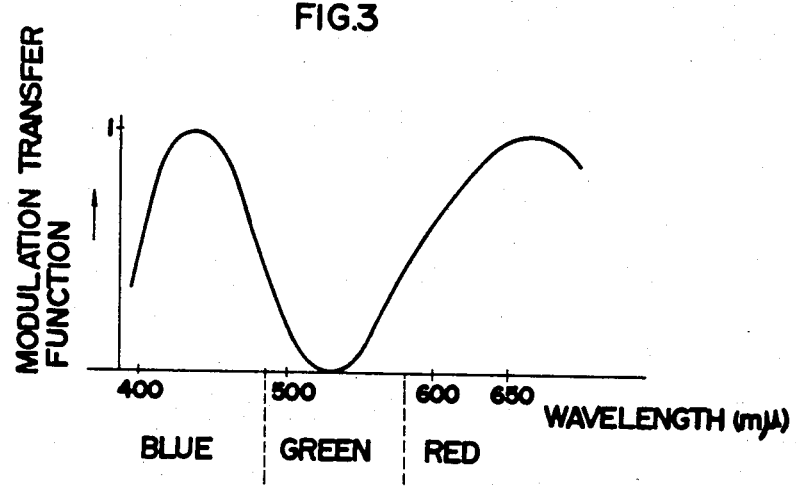
FIG. 3 is a graph showing the variation of the MTF value at a bending point in the modulation transfer function of the embodiment due to the wavelength.
Figure 4:
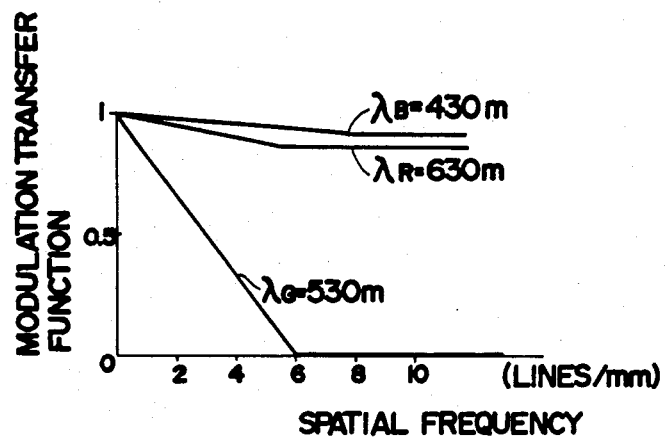
FIG. 4 is a graph indicating the modulation transfer functions for 3 wavelengths selected respectively between blue, green and red wavelength ranges in the embodiment.

Assume that a filter according to the embodiment is mounted in front of a sharp objective lens with 300 mm focal length and that spots 11 on the substrate shown in FIG. 1 are round with an average diameter of 1 mm. Furthermore, assume that the total area $A_{11}$ of a plurality of spots 11 is equal to a total area $A_{12}$ of portion 12 other than spots 11. With these conditions, FIG. 3 shows the variations of the MTF value at the bending point due to wavelength, under the condition m=2 and $\lambda_0 = \lambda G = 530$ mμ in formula (2). Additionally, FIG. 4 shows the MTF for green light (λG=530 mμ), that for blue light (λB=430 mμ), and that for red light (λR=630 mμ), respectively. As is obvious from FIGS. 3 and 4, the filter according to the present invention produces desirable characteristics for portrait photography, by providing a soft focus effect for the transmitted green light and substantially no soft focus effect in the blue and red light.

Figure 5:
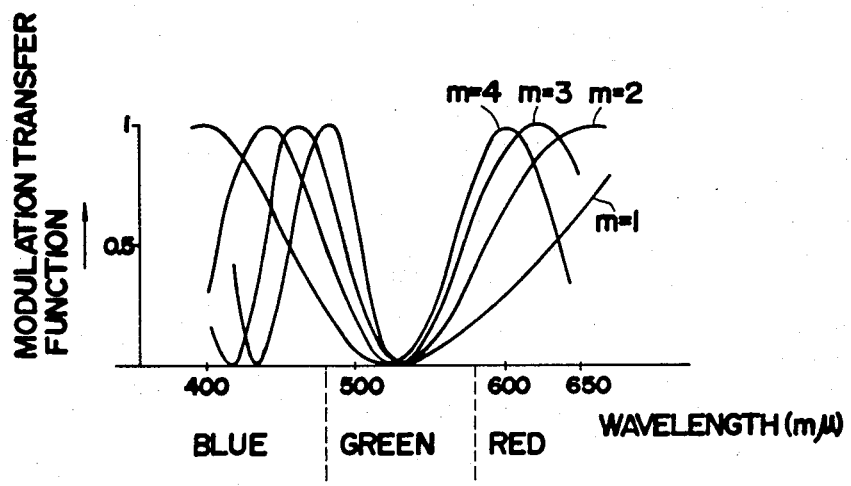
FIGS. 5 and 6 are the graphs showing the variations of the MTF value at the bending point due to the wavelength in various conditions describing the present invention.

FIG. 5 shows variations of the MTF value at the bending point due to the wavelength when m is varied (m=1, 2, 3 and 4) under the conditions λG=530 mμ and $A_{11}/A_{12}=1$. In the case of m=0, for the entire wavelength range of visible light, the MTF values at the bending point become small. Since such a filter produces a soft focus effect for the entire visible light transmitted there through, it does not attain the object of the present invention. On the other hand, an MTF value for the filter which causes MTF value at the bending point to decrease again in the blue light region (λ<480 mμ), whereby the filter has a soft focus effect not only for the green light but also for the blue light. Obviously, this does not attain the object of the present invention.

From the above description, it is found that satisfying the formula (4) is basically a necessary condition for the filter of the present invention.

The conditon is described as follows.

$$\delta = (2m+1)\frac{\lambda G}{2}$$

(m=1, 2, 3 and 4)

(λG = a predetermined design wavelength selected in green wavelength range)

It should be noted that the assumption of $A_{11}=A_{12}$ in the above embodiment corresponds to a case where an MTF value at the bending point (minimum MTF value) becomes zero at the design wavelength, as is apparent from formula (2). To attain the object of the present invention, however, it is not required that the MTF value M at the bending point the zero that the design wavelength, but a practical effect is expected when the MTF value M at the bending point is below 0.5. (In principle, it is enough that the MTF value at the bending point depends on the wavelength of transmitted light.) As is clear from formula (2), the MTF value M at the bending point in the design wavelength depends upon a ratio between the total area $A_{11}$ having a plurality of spots 11 and total area $A_{12}$ of portion 12 other than spots 11. Therefore, area ratio $A_{11}/A_{12}$ when minimum MTF value M is below 0.5 is calculated.

When the condition of formula (4) is satisfied (where M is minimum), formula (2) is written below:

$$M = \left| \frac{A_{12}-A_{11}}{A_{11}+A_{12}} \right|^2 \quad (5)$$

With M=0.5, the following is obtained:

$$6 \geq \frac{A_{11}}{A_{12}} \geq \frac{1}{6} \quad (6)$$

Figure 6:
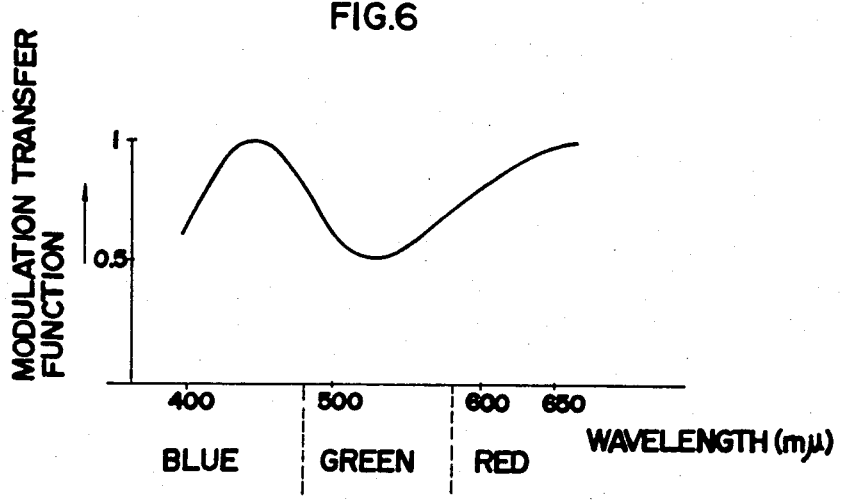

This becomes the practical conditions to obtain the effect of the present invention. FIG. 6 shows variations in MTF value M at the MTF bending point when m=2, λG=530 mμ, and $A_{11}/A_{12}=1/6$ are assumed. As is apparent from formula (5), an MTF value M of the area ratio $A_{11}/A_{12}=P$ (P is a constant) is equal to a MTF value M of area ratio $A_{11}/A_{12}=1/P$. Therefore, the diagram shown in FIG. 6 is equal to the diagram when $A_{11}/A_{12}=6$ is assumed. In this sense, when it is defined that, within the 2 portions for producing a phase difference, one smaller total area is indicated by Aa, and the other larger total area is indicated by Ab, (when the total area of 11 is larger than that of 12 in FIG. 1, total area of 12 is defined as Aa and total area of 11 as Ab), formula (6) is expressed as follows:

$$1 \geq (Aa/Ab) \geq 1/6$$

Figure 7:
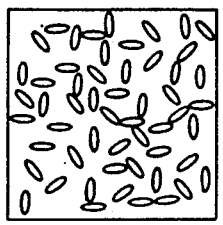
FIGS. 7 and 8 are front views of the optical filters acording to the other embodiments of the present invention, respectively.

FIG. 7 shows an optical filter of another embodiment according to the present invention. Disposed at random on a transparent substrate are a plurality of transparent minute spots, which comprise ellipsoidal spots with identical size. The spots are so arranged that the axes of ellipsis point to random directions. The optical filter shown in FIG. 7 improves the soft focus effect in comparison with the optical filter shown in FIG. 1. The reason therefore are as follows. In the optical filter shown in FIG. 1, since the spots have identical nondirective configurations, it is probable to occurr interference between the light transmitted through the spots. Therefore, several rings may be produced brightly in halo of a point image. However, in the optical filter shown in FIG. 7, since the spots have identical directive configuration and are arranged in a random direction, interference between the light transmitted through the spots is negligible. Therefore, the filter shown in FIG. 7 produces an image of a point as an image with a core in it and halo of nearly constant intensity at its peripheral ellipsoidal region, thereby the soft focus effect is improved.

Figure 8:
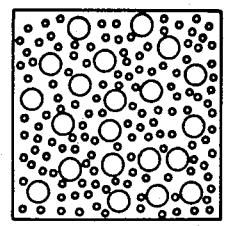

FIG. 8 shows an optical filter of another embodiment according to the present invention. Disposed at random on a transparent substrate are a plurality of transparent minute spots, which comprise round spots of different diameters. In the optical filter shown in FIG. 8, since the spots have different non-directive configurations, the interference between the light transmitted through the spots is again negligible. Furthermore, since the spots comprise round spots, an improved soft focus effect to produce an image of a point as an image with a core in it and halo of nearly constant intensity at its peripheral round region is obtained. Therefore, the optical filter shown in FIG. 8 provides an improved soft focus effect in comparison with the optical filters shown in FIGS. 1 and 7.

On each of the embodiments described above, the spots in a substrate are manufactured by the well-known vacuum evaporating method with a mask having openings formed in accordance with the shape, size and, arrangement of the spots. The vacuum evaporating is continued until the thicknesses of the spots satisfy the formula (1) with respect to $\delta$ which meets the condition of formula (4). With $n_{11}=2.0$ and $n_{12}=1.0$ in the embodiments, for example, the result is $d=1.325\mu$, assuming $m=2$ and $\lambda G=530$ m$\mu$. Other ion exchange method, photoresist method or the like can be used for manufacturing the spots on the substrate.

A filter according to the present invention is applicable not only to photographic objective lenses but also to enlarging lens systems.

What is claimed is:

1. An optical filter for use with a sharp imaging lens, comprising a transparent substrate and a plurality of transparent minute spots disposed at random on said substrate for producing a phase difference between a wave front transmitted through said spots and that transmitted through the portion of the substrate other than said spots, said phase difference $\delta$ satisfying the following condition for producing a selective soft focus effect only for green light transmitted through said filter:

$$\delta = \frac{2m+1}{2} \lambda G$$

wherein m is an integer selected from 1, 2, 3 and 4, and $\lambda G$ is a design wavelength selected within the green wavelength range.

2. The invention according to claim 1, said optical filter further satisfies the following condition:

$$1 \geq \frac{Aa}{Ab} \geq \frac{1}{6}$$

wherein Aa is the smaller total area between the total area of said spots and the total area of the portion other than said spots, while Ab is the larger total area.

3. The invention according to claim 1, wherein said plurality of transparent minute spots comprise round spots of identical diameter.

4. The invention according to claim 1, wherein said plurality of transparent minute spots include round spots of different diameters.

5. The invention according to claim 1, wherein said plurality of transparent minute spots comprise ellipsoidal spots arranged so that the axes of ellipsis point to random directions.

* * * * *